US012400621B2

(12) United States Patent
Baek

(10) Patent No.: US 12,400,621 B2
(45) Date of Patent: Aug. 26, 2025

(54) STRING INSTRUMENT

(71) Applicant: Am Baek, Seoul (KR)

(72) Inventor: Am Baek, Seoul (KR)

( * ) Notice: Subject to any disclaimer, the term of this patent is extended or adjusted under 35 U.S.C. 154(b) by 0 days.

(21) Appl. No.: 18/846,647

(22) PCT Filed: Mar. 7, 2023

(86) PCT No.: PCT/KR2023/003089
§ 371 (c)(1),
(2) Date: Sep. 12, 2024

(87) PCT Pub. No.: WO2023/177140
PCT Pub. Date: Sep. 21, 2023

(65) Prior Publication Data
US 2025/0111836 A1 Apr. 3, 2025

(30) Foreign Application Priority Data
Mar. 15, 2022 (KR) ........................ 10-2022-0032162

(51) Int. Cl.
*G10D 3/02* (2006.01)
*G10D 1/08* (2006.01)
*G10D 3/04* (2020.01)
*G10D 3/06* (2020.01)
*G10D 3/12* (2020.01)
*G10D 3/14* (2020.01)

(52) U.S. Cl.
CPC ................. *G10D 3/02* (2013.01); *G10D 1/08* (2013.01); *G10D 3/04* (2013.01); *G10D 3/06* (2013.01); *G10D 3/12* (2013.01); *G10D 3/14* (2013.01)

(58) Field of Classification Search
CPC .. G10D 3/02; G10D 1/08; G10D 3/04; G10D 3/06; G10D 3/12; G10D 3/14
See application file for complete search history.

(56) References Cited

U.S. PATENT DOCUMENTS

| | | | | | |
|---|---|---|---|---|---|
| 1,472,991 | A * | 11/1923 | Pribyl | ...................... | G10D 1/08 84/263 |
| 1,773,133 | A * | 8/1930 | Faccaro | ................... | G10D 1/02 84/274 |

(Continued)

FOREIGN PATENT DOCUMENTS

| | | |
|---|---|---|
| JP | 2006279471 | 10/2006 |
| KR | 20000000075 | 1/2000 |

(Continued)

OTHER PUBLICATIONS

"Office Action of China Counterpart Application", with English translation thereof, issued on Apr. 28, 2025, pp. 1-7.

*Primary Examiner* — Robert W Horn
(74) *Attorney, Agent, or Firm* — JCIPRNET

(57) ABSTRACT

The present invention relates to a string instrument having a new structure that can amplify resonance using an analog method. In the string instrument according to the present invention, since auxiliary strings are provided inside a main body, when a user strums strings to play the string instrument, sound generated by the strings is amplified as the auxiliary strings vibrate due to vibration of the strings. Therefore, there is an advantage in that the sound generated when playing the string instrument becomes more vibrant.

5 Claims, 12 Drawing Sheets

(56) References Cited

U.S. PATENT DOCUMENTS

| | | | | | |
|---|---|---|---|---|---|
| 2,124,243 | A * | 7/1938 | Carter | G10D 1/02 | 984/103 |
| 2,250,402 | A * | 7/1941 | Towell | G10D 1/08 | 84/263 |
| D224,567 | S * | 8/1972 | Pelensky | D17/14 | |
| 4,282,792 | A * | 8/1981 | Voorthuyzen | G10D 1/02 | 984/103 |
| 4,873,909 | A * | 10/1989 | Humphrey | G10D 3/06 | 984/106 |
| 5,251,526 | A * | 10/1993 | Hill | G10D 1/085 | 84/293 |
| 5,949,006 | A * | 9/1999 | Hechler | G10D 3/02 | 84/290 |
| 6,777,601 | B1 * | 8/2004 | Kerfoot | G10D 3/02 | 84/307 |
| 8,217,245 | B1 * | 7/2012 | McKenney | G10D 3/02 | 84/267 |
| 8,569,602 | B2 * | 10/2013 | Nash | G10D 3/12 | 84/267 |
| 8,895,824 | B2 * | 11/2014 | Martin | G10D 3/02 | 84/307 |
| 9,018,501 | B2 * | 4/2015 | Tanabe | G10D 3/12 | 84/297 R |
| 2008/0190263 | A1 | 8/2008 | Drew | | |
| 2020/0365120 | A1 | 11/2020 | Warner | | |
| 2022/0366876 | A1 * | 11/2022 | Lopez | G10D 1/08 | |

FOREIGN PATENT DOCUMENTS

| | | |
|---|---|---|
| KR | 20190011665 | 2/2019 |
| KR | 102460627 | 10/2022 |

* cited by examiner

STRING INSTRUMENT

CROSS-REFERENCE TO RELATED APPLICATION

This application is a 371 of international application of PCT application serial no. PCT/KR2023/003089, filed on Mar. 7, 2023 which claims the priority benefit of Korean application no. 10-2022-0032162, filed on Mar. 15, 2022. The entirety of the above-mentioned patent application is hereby incorporated by reference herein and made a part of this specification.

TECHNICAL FIELD

The present invention relates to a string instrument having a new structure that can amplify resonance using an analog method.

BACKGROUND ART

Generally, as illustrated in FIGS. 1 and 2, an acoustic guitar used in accompaniment or the like includes a main body (10) having a space portion formed therein, a neck (20) provided to extend forward from one side of the main body (10) and have tuning pegs (21) provided at a front end portion, and a plurality of strings 30 having both ends fixed to the tuning pegs (21) and the main body (10).

The main body (10) is formed in the shape of a case having an upper plate (11), a sound hole (12) is formed in the upper plate (11), and a bridge (13) is provided on the upper plate (11).

The strings (30) have both ends fixed to the tuning pegs (21) and the bridge (13).

Therefore, when a user strums the strings (30), the strings (30) vibrate and generate sound, and here, as the body vibrates and amplifies the sound, people around the acoustic guitar can listen to loud music.

However, since the acoustic guitar generates sound simply by the resonance of the strings (30) provided outside the main body (10), there is a problem in that the sound feels weak.

In order to address such a problem, an electric guitar that amplifies sound using a pickup coil has been developed, but since the electric guitar gives a different feeling of amplifying sound using an analog method, there is a need for a new method that can amplify resonance using an analog method and give a more vibrant feeling.

The above problem identically occurs in all types of string instruments including strings (30) and a body having a space portion formed therein, such as a classic guitar, an ukulele, a violin, and a cello, in addition to the above-described acoustic guitar.

Meanwhile, the strings (30) may be a type in which both ends are straight or a type in which a ball end (41) is provided at one end as illustrated in FIG. 3.

DISCLOSURE

Technical Problem

The present invention has been devised to address the above problem and is directed to providing a string instrument having a new structure that can amplify resonance using an analog method.

Technical Solution

The present invention provides a string instrument including a main body (10) having a space portion formed therein and a sound hole (12) formed at one side thereof, a neck (20) provided to extend forward from the one side of the main body (10) and have a tuning peg (21) provided at a front end portion, and a plurality of strings (30) having both ends fixed to the tuning peg (21) and the main body (10), wherein a through-hole (14) is formed at the one side of the main body (10), and an auxiliary string (40) inserted into the main body (10) through the through-hole (14) is provided inside the main body (10).

According to another feature of the present invention, the string instrument may further include a support member (50) coupled to the through-hole (14) and an auxiliary tuning peg (61) provided at the other side of the main body (10), and the auxiliary string (40) may have both ends fixed to the support member (50) and the auxiliary tuning peg (61).

According to yet another feature of the present invention, an auxiliary through-hole (15) may be formed at the other side of the main body (10), the string instrument may further include an auxiliary support member (62) coupled to the auxiliary through-hole (15), and the auxiliary tuning peg (61) may be provided at the auxiliary support member (62).

According to still another feature of the present invention, the string instrument may further include a support frame (90) inserted into the main body (10) through the through-hole (14) and to which the auxiliary string (40) is fixed, and the support frame (90) may include a first support plate (91) detachably coupled to the through-hole (14), a second support plate (92) provided to be spaced apart from the first support plate (91), a support bar (93) configured to connect the first and second support plates (91, 92), and an auxiliary tuning peg (94) provided at the first support plate (91) or the second support plate (92).

According to still another feature of the present invention, the string instrument may further include a muting mechanism (70) provided at the main body (10) to selectively come in contact with the auxiliary string (40) and mute the auxiliary string (40).

Still another feature of the present invention provides a string instrument including a main body (10) having a space portion formed therein, a neck (20) provided to extend forward from one side of the main body (10) and have a tuning peg (21) provided at a front end portion, and a plurality of strings (30) having both ends fixed to the tuning peg (21) and the main body (10), wherein rear end portions of the strings (30) pass through the main body (10) and extend to the inside of the main body (10), and the string instrument further includes a muting mechanism (70) provided at the main body (10) to selectively come in contact with the rear end portions of the strings (30) extending to the inside of the main body (10) and mute an auxiliary string (40).

According to still another feature of the present invention, a bridge (13) may be provided on an upper plate (11) of the main body (10), communication holes (11*a*, 13*a*) through which the rear end portions of the strings (30) pass may be formed in the upper plate (11) and the bridge (13), respectively, an auxiliary through-hole (15) may be formed in a peripheral surface of the main body (10), an auxiliary bridge (16) may be provided on the peripheral surface of the main body (10), and the rear end portions of the strings (30) may pass through the auxiliary through-hole (15) and be fixed to the auxiliary bridge (16).

Advantageous Effects

Since a string instrument according to the present invention has auxiliary strings (40) provided inside a main body (10) thereof, when a user strums strings (30) to play the string instrument, sound generated by the strings (30) is amplified as the auxiliary strings (40) vibrate due to vibration of the strings (30).

Therefore, there is an advantage in that the sound generated when playing the string instrument becomes more vibrant.

MODES OF THE INVENTION

Figure 1:
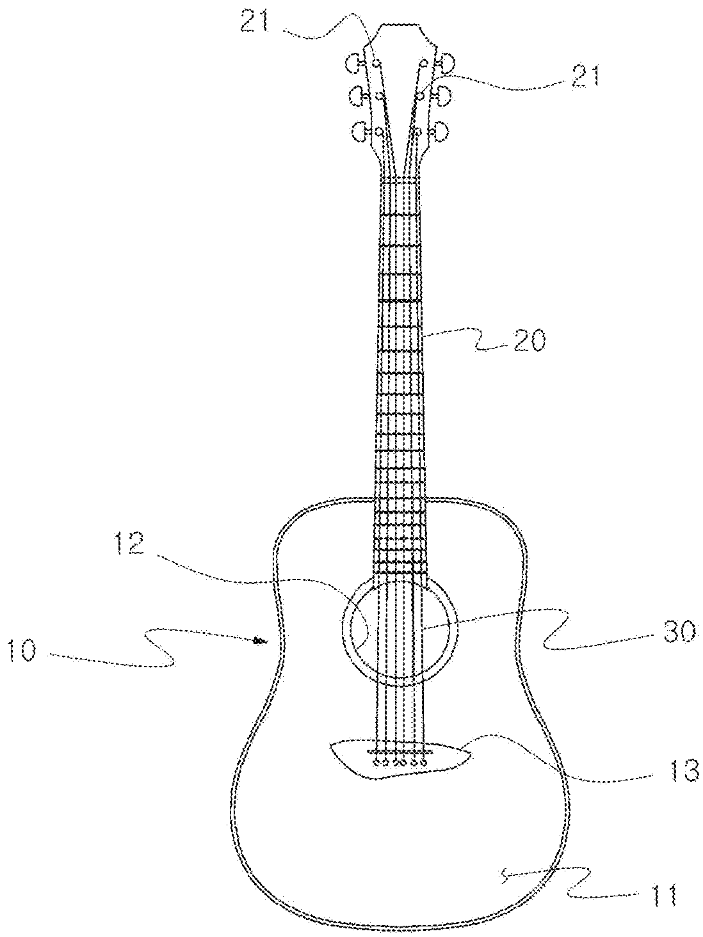
FIG. 1 (PRIOR ART)
FIG. 1 is a plan view illustrating one example of a conventional string instrument.
Figure 2:
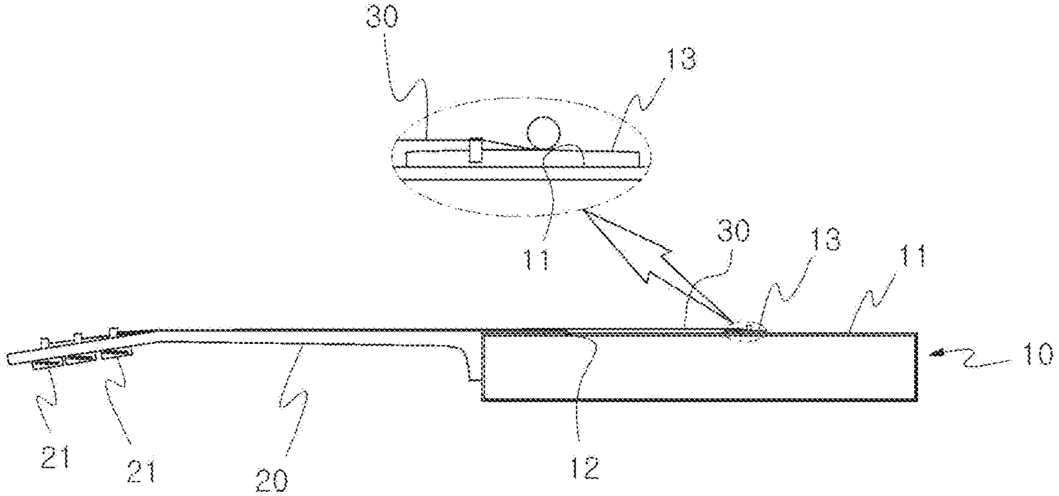
FIG. 2 (PRIOR ART)
FIG. 2 is a side cross-sectional view illustrating the one example of the conventional string instrument.
Figure 3:
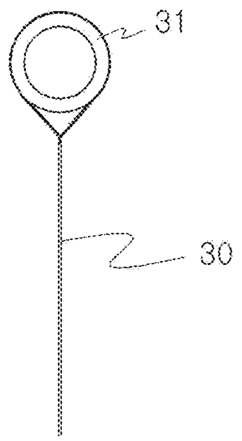
FIG. 3 (PRIOR ART)
FIG. 3 is a reference view illustrating a string used in the conventional string instrument.

Hereinafter, the present invention will be described in detail with reference to the accompanying exemplary drawings.

FIGS. 4 to 9 illustrate a string instrument according to the present invention and show a case in which the present invention is applied to a typical acoustic guitar having six strings 30.

According thereto, the string instrument is the same as the conventional string instrument in that the string instrument includes a main body 10 having a space portion formed therein, a neck 20 provided to extend forward from one side of the main body 10 and have tuning pegs 21 provided at a front end portion, and a plurality of strings 30 having both ends fixed to the tuning pegs 21 and the main body 10.

Here, the main body 10 is formed in the shape of a case having an upper plate 11, a sound hole 12 is formed in the upper plate 11, and a bridge 13 is provided on the upper plate 11.

The strings 30 have both ends fixed to the tuning pegs 21 and the bridge 13.

Also, according to the present invention, auxiliary strings 40 are provided inside the main body 10.

In more detail, a through-hole 14 is formed at one side of the main body 10, and an auxiliary through-hole 15 is formed at the other side of the main body 10.

The through-hole 14 is formed in a front peripheral surface of the main body 10, and the auxiliary through-hole 15 is formed in a rear peripheral surface of the main body 10.

Also, a support member 50 coupled to the through-hole 14 and an auxiliary tuning peg 61 provided at the other side of the main body 10 are further provided.

Figure 5:
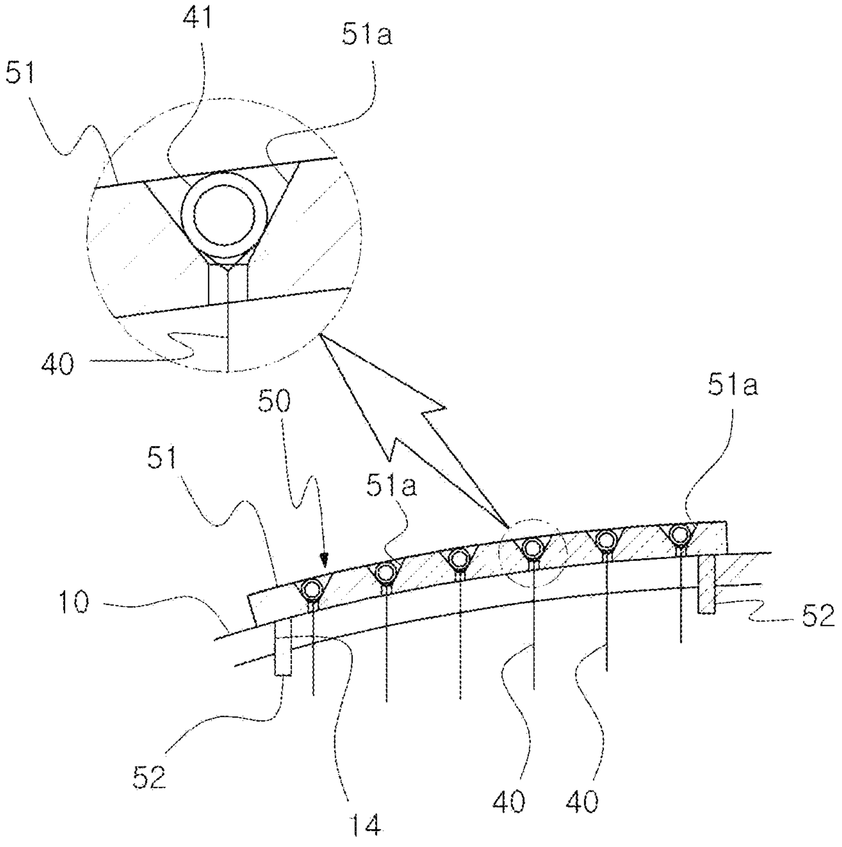
FIG. 5 is a plan cross-sectional view illustrating an enlarged view of a main part of the string instrument according to the present invention.
Figure 6:
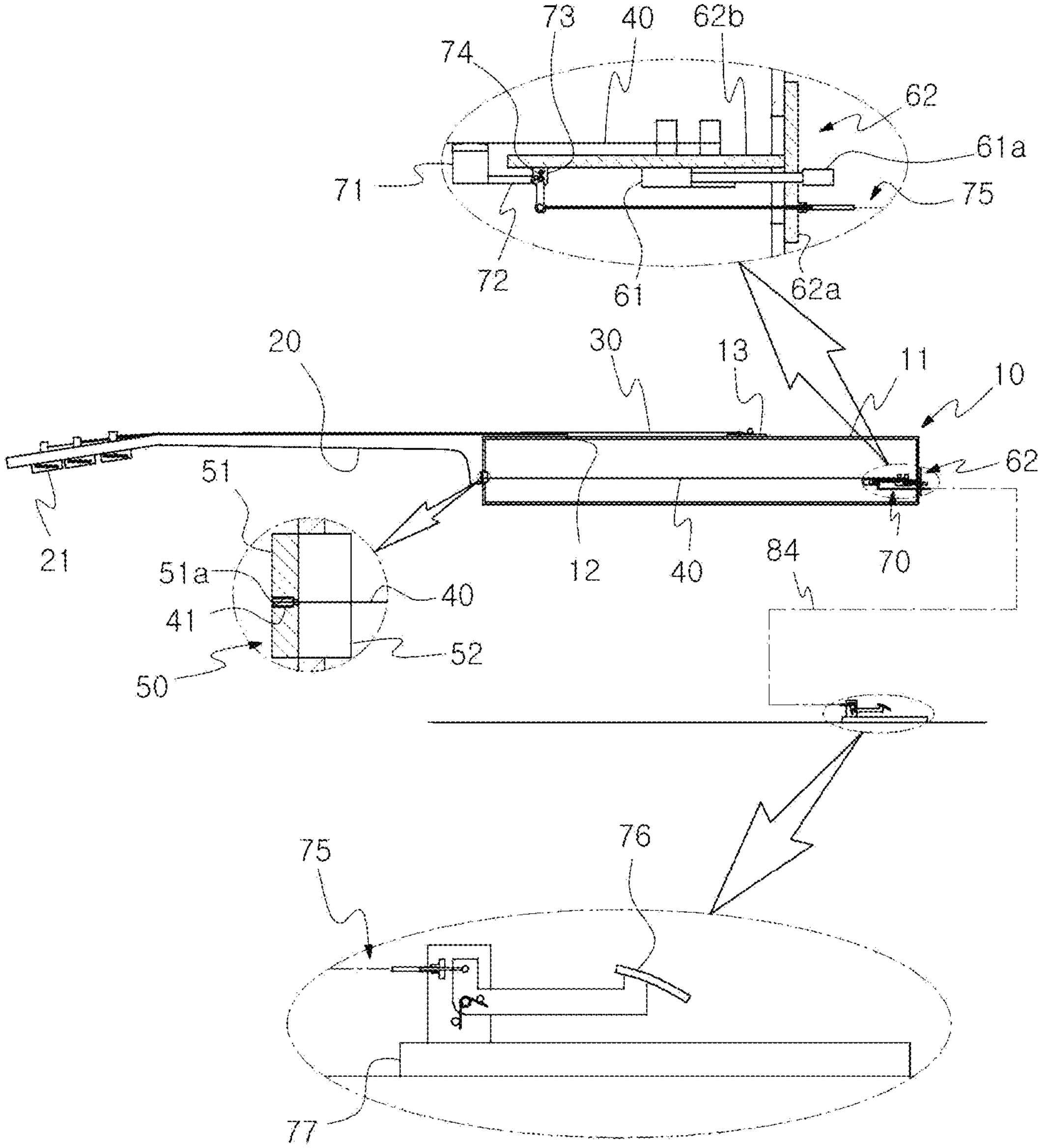
FIG. 6 is a side cross-sectional view illustrating the string instrument according to the present invention.
Figure 7:
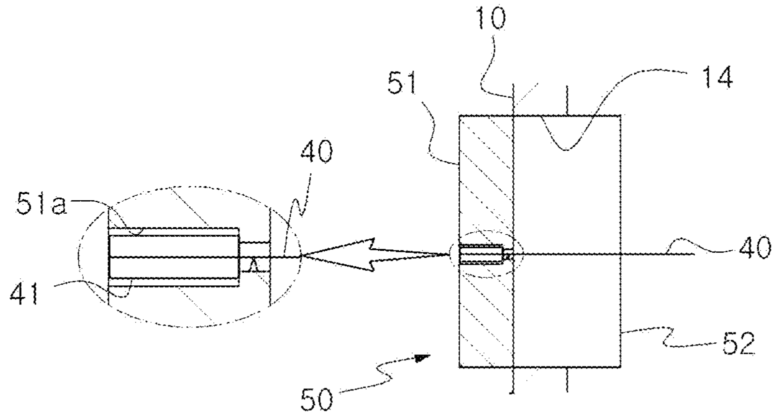
FIGS. 7 to 9 are side cross-sectional views illustrating enlarged views of main parts of the string instrument according to the present invention.

As illustrated in FIGS. 5 to 7, the support member 50 includes a support plate 51 having six fixing holes 51*a* formed to pass through front and rear surfaces thereof and a pair of extension plates 52 extending rearward from both sides of the rear surface of the support plate 51.

The auxiliary tuning peg 61 is provided at an auxiliary support member 62 coupled to the auxiliary through-hole 15.

The auxiliary support member 62 includes an auxiliary support plate 62*a* coupled to the auxiliary through-hole 15 and an auxiliary extension plate 62*b* extending forward from the auxiliary support plate 62*a*.

Figure 4:
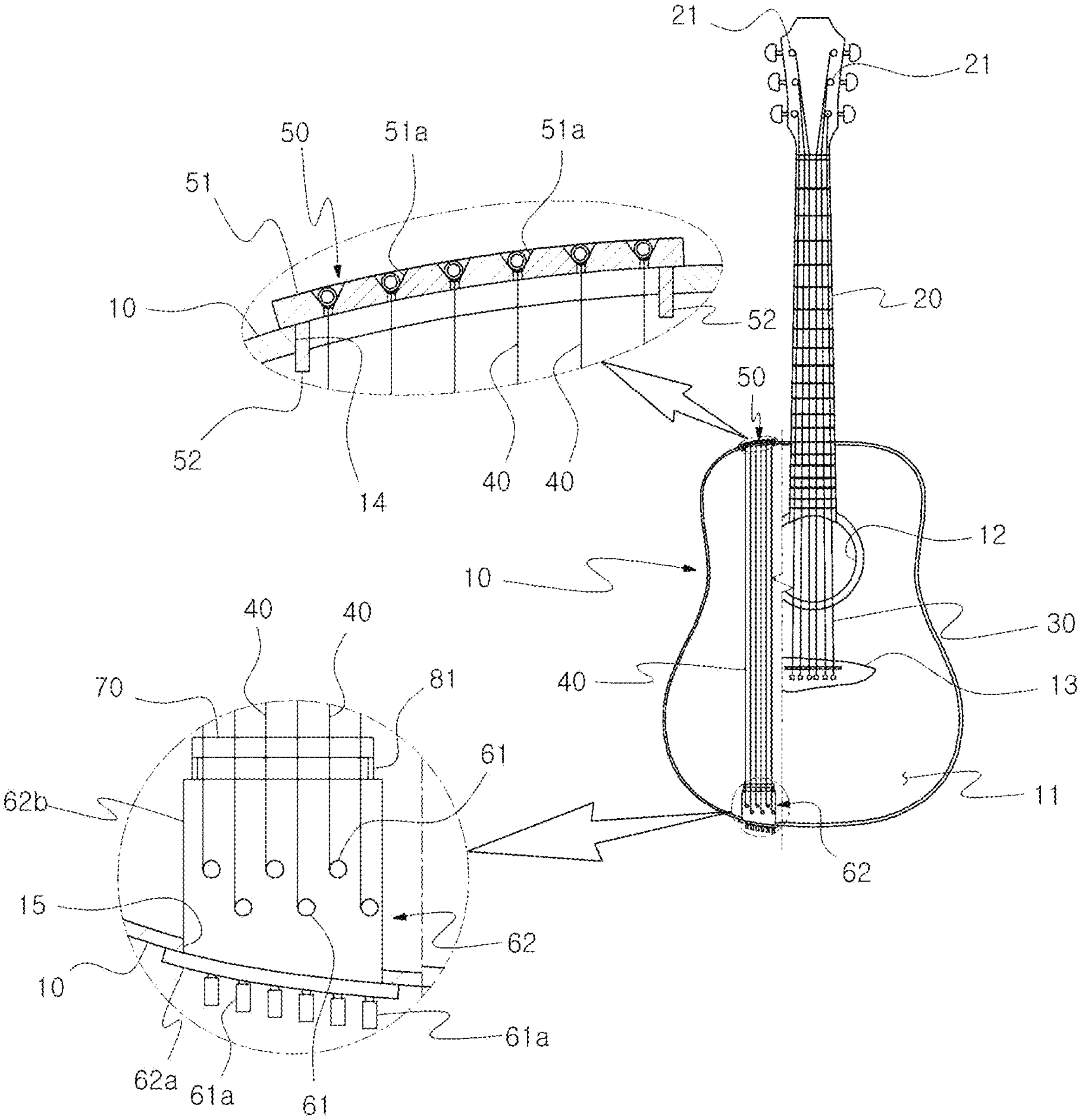
FIG. 4 is a plan cross-sectional view illustrating a string instrument according to the present invention.
Figure 8:
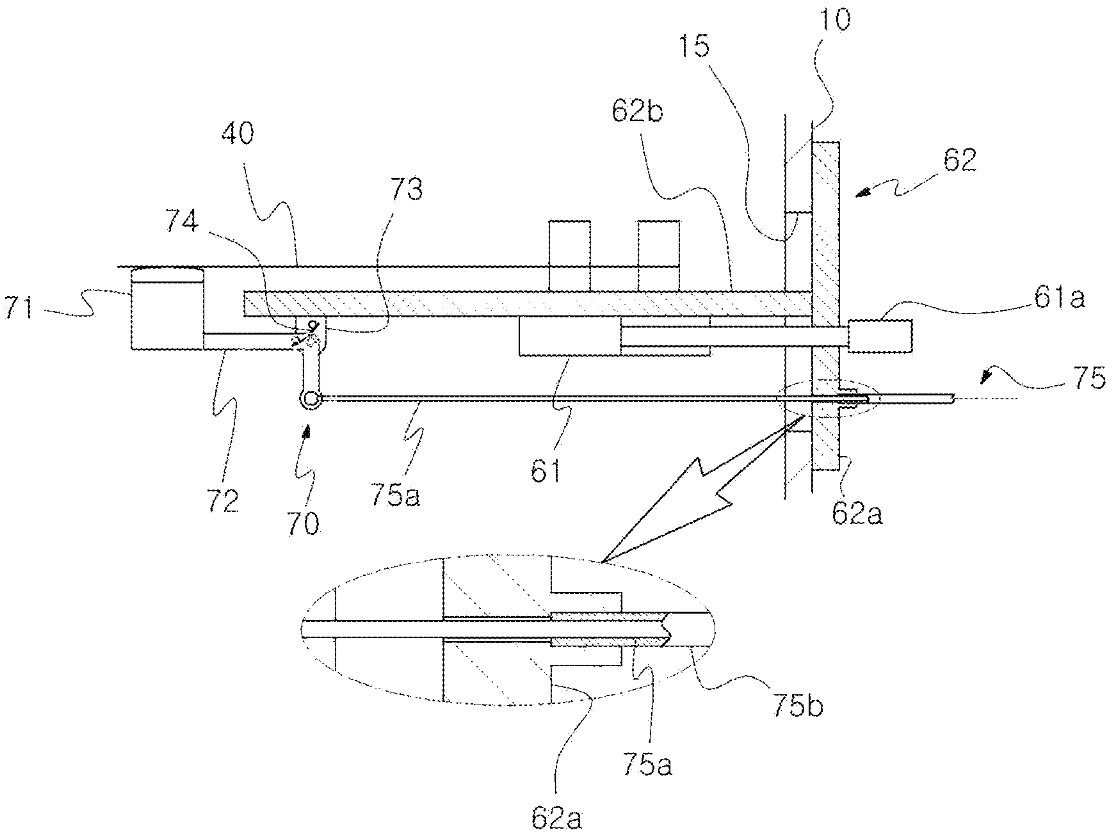

As illustrated in FIGS. 4 and 8, the auxiliary tuning peg 61 is provided as six auxiliary tuning pegs 61, the auxiliary tuning pegs 61 are fixed to the auxiliary extension plate 62*b*, and operating levers 61*a* for operating the auxiliary tuning pegs 61 extend to the outside of the main body 10.

The type of string having a ball end 41 provided at a front end portion is used as the auxiliary strings 40, six auxiliary strings 40 are provided to correspond to the strings 30, and each auxiliary string 40 has a front end portion coupled to the support member 50 so that the ball end 41 is caught in the fixing hole 51*a* of the support member 50 and a rear end portion coupled to the auxiliary tuning peg 61.

Therefore, when the rear end portions of the auxiliary strings 40 are allowed to pass through the fixing holes 51*a* and be coupled to the auxiliary tuning pegs 61 at the front of the support member 50, and then the operating levers 61*a* of the auxiliary tuning pegs 61 are operated to wind the auxiliary strings 40 around the auxiliary tuning pegs 61, the ball ends 41 of the auxiliary strings 40 are caught in the fixing holes 51*a* and fixed.

Also, when the auxiliary tuning pegs 61 are further tightened, as the auxiliary strings 40 are pulled taut, sound of each auxiliary string 40 is adjusted.

Here, preferably, each auxiliary string 40 may be tuned to C, E, G, B, D, or F #.

Also, a muting mechanism 70 configured to selectively come in contact with the auxiliary strings 40 and mute the auxiliary strings 40 is provided at the main body 10.

Figure 9:
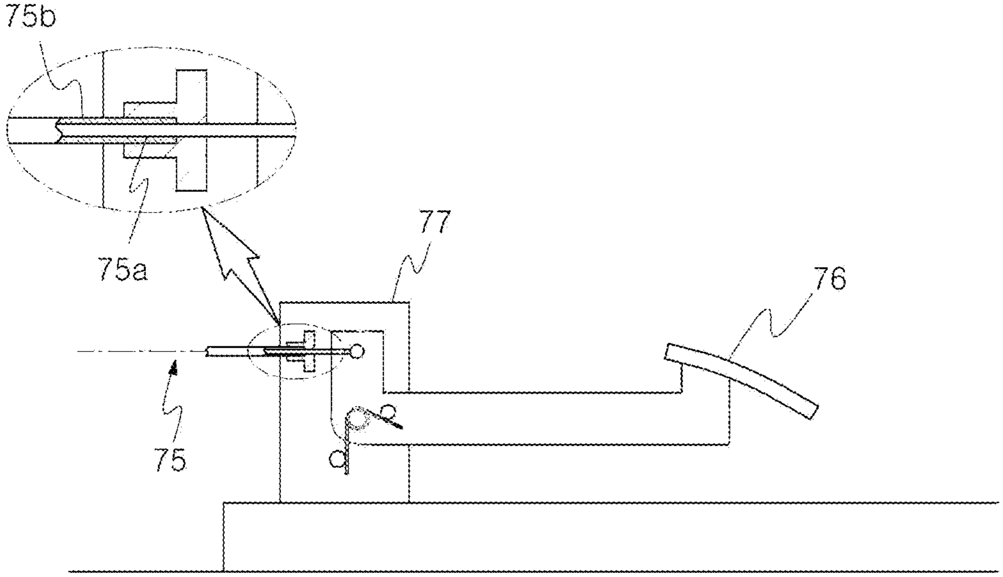

As illustrated in FIGS. 8 and 9, the muting mechanism 70 includes a muting member 71 configured to selectively come in contact with the auxiliary strings 40 and mute the auxiliary strings 40, a rotating bar 72 extending rearward from the muting member 71 and vertically rotatably coupled to a bracket 73 provided at the auxiliary extension plate 62*b*, an elastic member 74 connected to the rotating bar 72 to apply pressure thereto so that the muting member 71 comes in close contact with the auxiliary strings 40, an extension cable 75 connected to the rotating bar 72, and a footrest 76 connected to an end portion of the extension cable 75 and vertically rotatably coupled to a support 77.

The extension cable 75 includes an inner cable 75*a* having both ends connected to the rotating bar 72 and the footrest 76 and a housing 75*b* configured to surround an outer side of the inner cable 75*a*, and the inner cable 75*a* is configured to slide inside the housing 75*b*.

Since the extension cable 75 is commonly used in a bicycle brake or the like, further detailed description thereof will be omitted.

Therefore, at ordinary times, the muting member 71 is in close contact with the auxiliary strings 40 due to the elastic member 74 and the auxiliary strings 40 do not vibrate, and when a user steps on the footrest 76 and the footrest 76 moves downward, as the inner cable 75*a* is pulled, the rotating bar 72 rotates downward and accordingly, the muting member 71 is spaced apart from the auxiliary strings 40 such that the auxiliary strings 40 can vibrate.

Since the string instrument configured as described above has the auxiliary strings 40 provided inside the main body 10, when the user strums the strings 30 to play the string instrument, sound generated by the strings 30 is amplified as the auxiliary strings 40 vibrate due to vibration of the strings 30.

Therefore, there is an advantage in that the sound generated when playing the string instrument becomes more vibrant.

Also, since the through-hole 14 is formed at the one side of the main body 10, the support member 50 coupled to the through-hole 14 and the auxiliary tuning pegs 61 provided at the other side of the main body 10 are further provided, and the auxiliary strings 40 have both ends fixed to the support member 50 and the auxiliary tuning pegs 61, there is an advantage in that the sound of each auxiliary string 40 can be adjusted by operating the auxiliary tuning pegs 61.

In particular, since the auxiliary through-hole 15 is formed at the other side of the main body 10, the auxiliary support member 62 is coupled to the auxiliary through-hole 15, and the auxiliary tuning pegs 61 are provided at the auxiliary support member 62, there is an advantage in that the auxiliary tuning pegs 61 are easy to install.

Also, since the muting mechanism 70 configured to selectively come in contact with the auxiliary strings 40 and mute the auxiliary strings 40 is further provided at the main body 10, the user may adjust sound to be generated or not generated by the auxiliary strings 40 by operating the muting mechanism 70 and adjusting the muting member 71 to be in close contact with the auxiliary strings 40 or spaced apart from the auxiliary strings 40.

Therefore, there is an advantage in that the user can freely adjust the tone of the string instrument while playing the string instrument.

Figure 10:
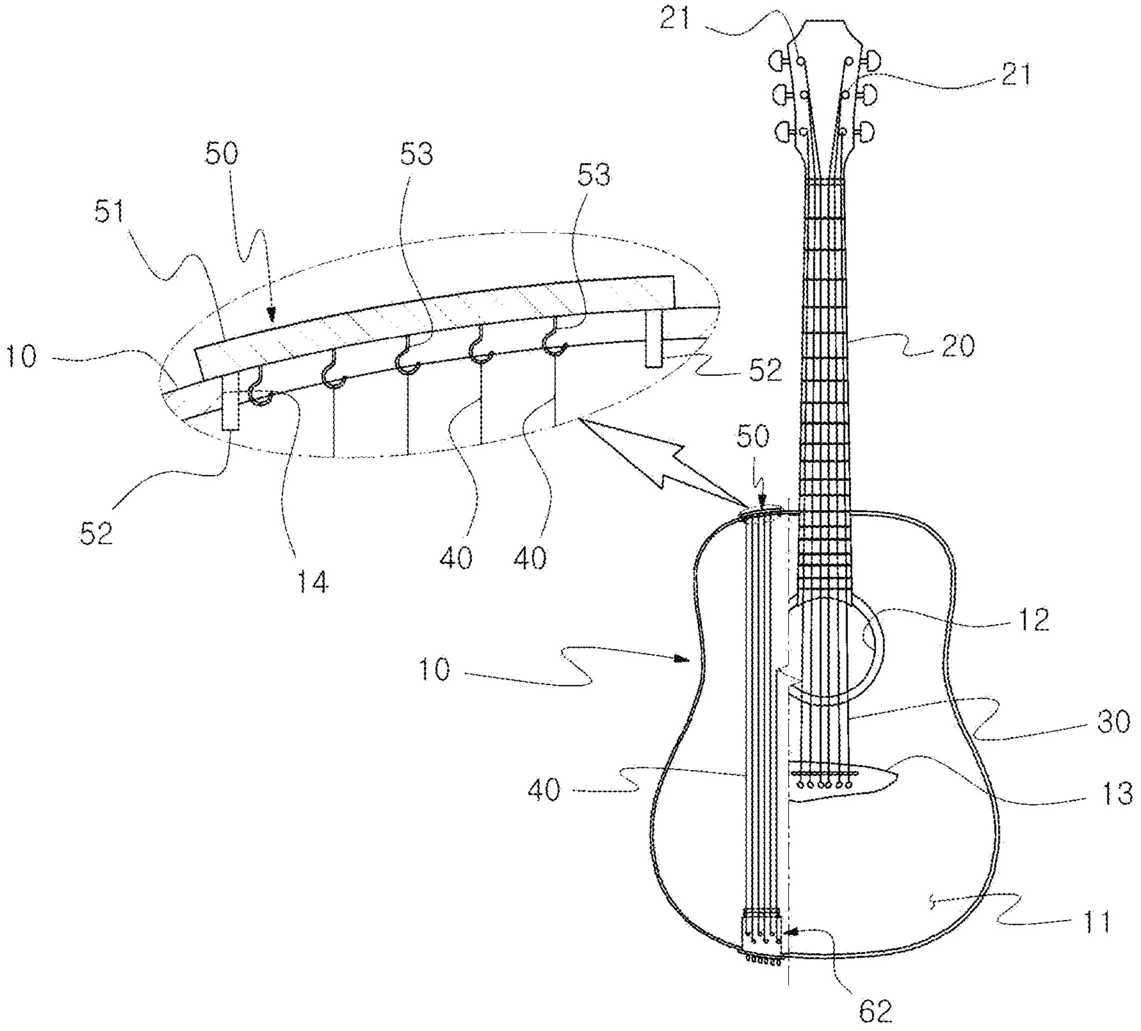
FIGS. 10 to 12 are side cross-sectional views illustrating modifications of the string instrument according to the present invention.

Although the case in which the type of string having the ball end 41 provided at one end is used as the auxiliary strings 40 has been described above as the case of the present embodiment, when the type of string not having the ball end 41 is used as the auxiliary strings 40, as illustrated in FIG. 10, hooks 53 are provided at the support member 50 so that the front end portions of the auxiliary strings 40 can be hung on the hooks 53 and fixed.

Figure 11:
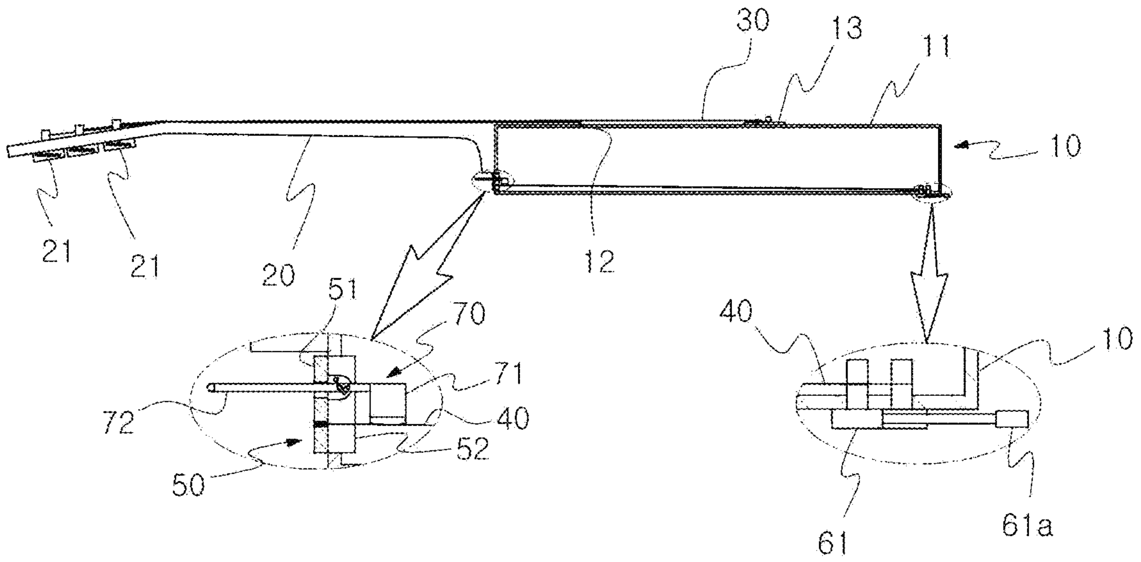

Also, although the auxiliary tuning pegs 61 have been described above as being provided at the auxiliary support member 62, the auxiliary tuning pegs 61 may be directly provided at the main body 10 as illustrated in FIG. 11

Figure 12:
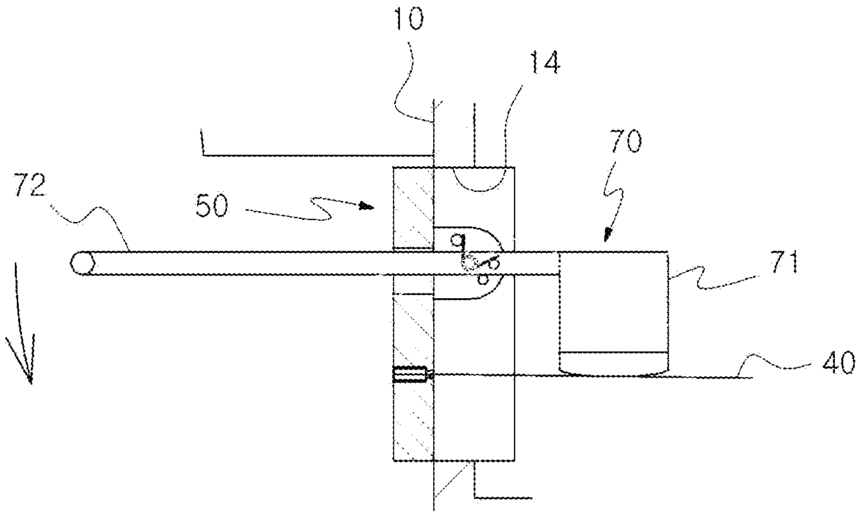

Also, although the muting mechanism 70 has been described above as being configured to be operated by the user stepping thereon by foot, as illustrated in FIGS. 11 and 12, the rotating bar 72 connected to the muting member 71 may extend to the outside of the main body 10, and the user may rotate the rotating bar 72 by hand and adjust the muting member 71 to be in close contact with the auxiliary strings 40 or spaced apart from the auxiliary strings 40.

Alternatively, an electric operating device operated by electricity may be used as the muting mechanism 70.

Also, the muting mechanism 70 may be configured to be fixed in a state in which the muting member 71 is spaced apart from the auxiliary strings 40.

Also, the positions of the through-hole 14 and the auxiliary through-hole 15 may be freely changed.

Also, the extension cable 75 may be detachably coupled to the rotating bar 72 or the footrest 76, and a middle portion of the extension cable 75 may be configured to be separable as necessary.

Also, at sites where there is a possibility of contact between the auxiliary strings 40 and each part of the string instrument, flats may be installed or separate support rods may be installed for the flats or the support rods to support each part of the auxiliary strings 40. In this way, the auxiliary strings 40 can be prevented from coming in contact with each part of the string instrument, and simultaneously, the range at which the auxiliary strings 40 vibrate, that is, the length of the auxiliary strings 40, may be shortened to enhance the tone of the string instrument.

Figure 13:
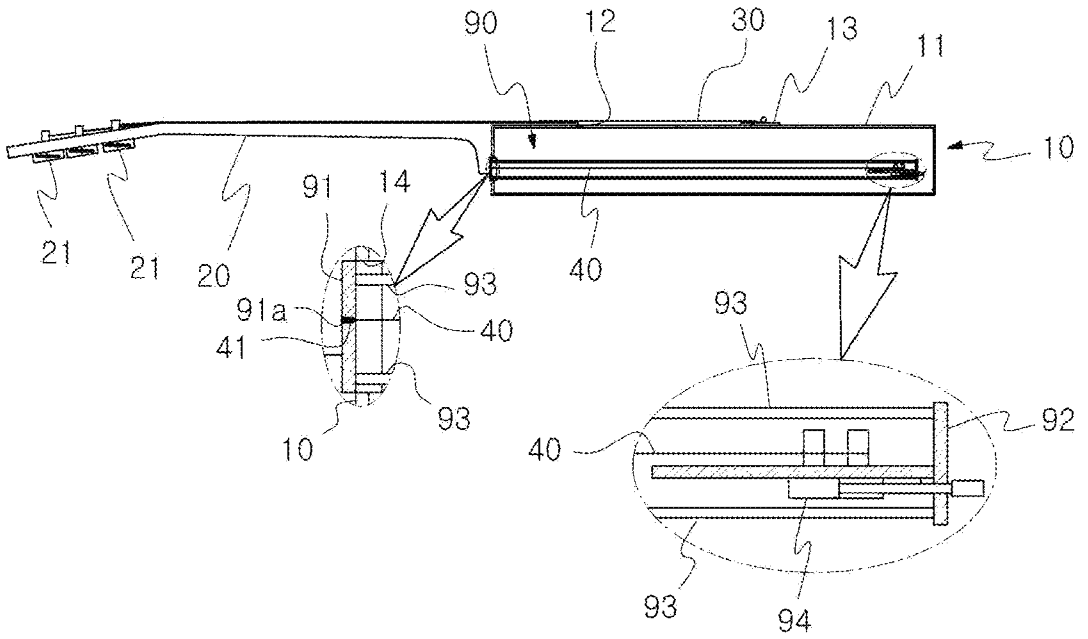
FIG. 13 is a side cross-sectional view illustrating a string instrument according to a second embodiment of the present invention.
Figure 14:
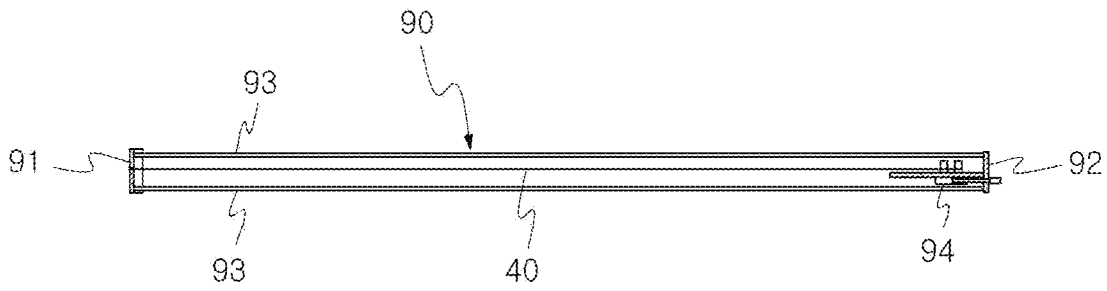
FIG. 14 is a side cross-sectional view illustrating a support frame of the string instrument according to the second embodiment of the present invention.
Figure 15:
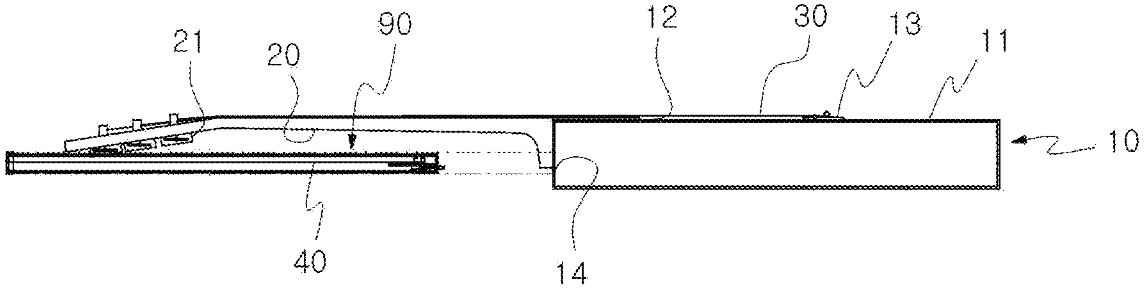
FIG. 15 is a side cross-sectional view illustrating an exploded state of the string instrument according to the second embodiment of the present invention.

FIGS. 13 to 15 illustrate a string instrument according to another embodiment of the present invention in which a through-hole 14 is formed at one side of the main body 10, and a support frame 90 to which the auxiliary strings 40 are fixed is provided at the through-hole 14.

The support frame 90 includes a first support plate 91 detachably coupled to the through-hole 14, a second support plate 92 provided to be spaced apart from the first support plate 91, a support bar 93 configured to connect the first and second support plates 91 and 92, and auxiliary tuning pegs 94 provided at the second support plate 92.

The first support plate 91 is detachably coupled to the through-hole 14 using a fixing screw (not illustrated).

Also, fixing holes 91*a* to which the ball ends 41 of the auxiliary strings 40 are fixed are formed in the first support plate 91.

Therefore, both ends of the auxiliary strings 40 may be coupled to the fixing holes 91*a* of the support frame 90 and the auxiliary tuning pegs 94 in a state in which the support frame 90 is separated, the auxiliary tuning pegs 94 may be adjusted to tune each auxiliary string 40, and then the support frame 90 may be inserted into the main body 10 through the through-hole 14 and fixed to complete the installation of the auxiliary strings 40.

In the string instrument configured as described above, since the auxiliary strings 40 are coupled to the support frame 90 detachably coupled to the through-hole 14, the support frame 90 may be separated to install or replace the auxiliary strings 40.

Therefore, there is an advantage in that the auxiliary strings 40 are easy to install or replace.

Although the case in which the auxiliary tuning pegs 94 are provided at the second support plate 92 has been described above as the case of the present embodiment, the fixing holes 91*a* may be formed in the second support plate 92, and the auxiliary tuning pegs 94 may be provided at the first support plate 91.

Also, although the structure of the muting mechanism 70 is omitted in the case of the present embodiment, the muting mechanism 70 may be provided at one side of the support frame 90.

Also, although it is described that a single support frame 90 is installed in the present embodiment, the present invention is not limited thereto. Within a range that a storage space inside the string instrument allows, a plurality of support frames may be installed. For example, two support frames may be disposed to intersect each other in an X-shape inside the string instrument.

Also, although not illustrated, the support frame 90 may be fixed to one or more of an upper plate, side plates, and a lower plate of the string instrument inside the string instrument. For example, the support frame 90 may be directly fixed to the upper plate 11 inside the string instrument, or a fixing brace structure fixed to the upper plate 11 may be disposed inside the string instrument. Thus, the support plates 91 and 92 of the support frame 90 may be fixed to the main body 10. However, the present invention is not limited thereto, and an additional fixing device for fixing the support frame 90 to the main body may be disposed between the support frame 90 and a rear plate (a plate opposing the upper plate 11) of the main body 10, and the support frame 90 may be firmly fixed to the main body 10 by the additional fixing device and the fixing brace structure.

Also, although not illustrated, a support rail (not illustrated) for facilitating the attachment and detachment of the support frame 90 may be further provided inside the main body 10. For example, the support rail (not illustrated) may be fixed to the upper plate 11 and the rear plate, and the support frame 90 may be detachably and firmly fixed to the upper plate 11 and the rear plate through the rail.

Figure 16:
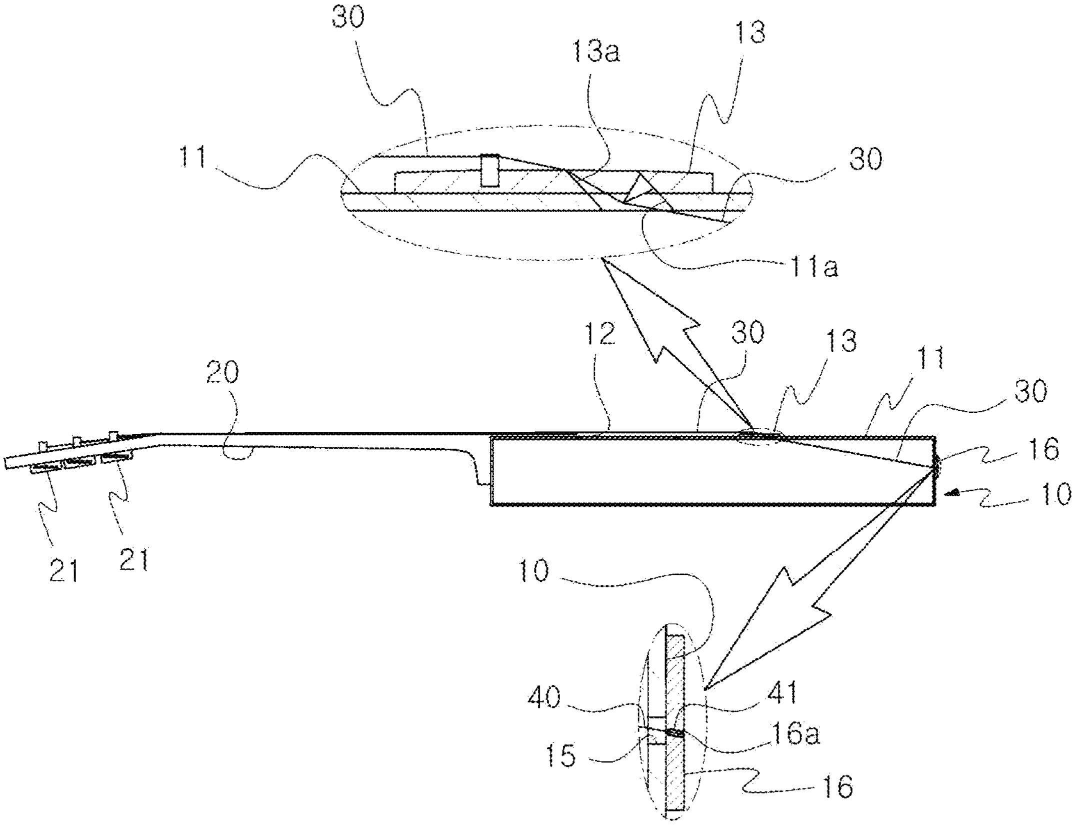
FIG. 16 is a side cross-sectional view illustrating a string instrument according to a third embodiment of the present invention.
Figure 17:
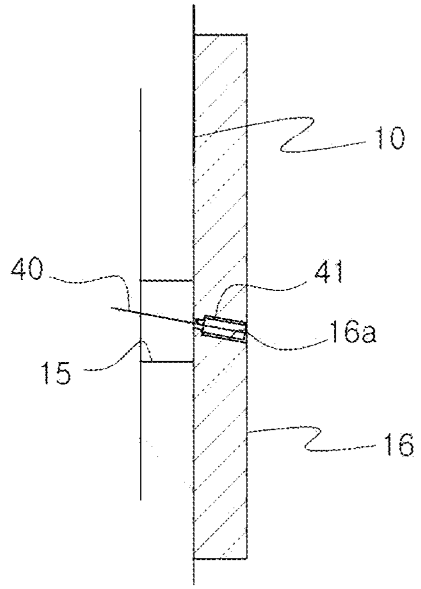
FIG. 17 is a side cross-sectional view illustrating an enlarged view of a main part of the string instrument according to the third embodiment of the present invention.

FIGS. 16 and 17 illustrate a string instrument according to yet another embodiment of the present invention in which the rear end portions of the strings 30 pass through the main body 10 and extend to the inside of the main body 10.

To this end, communication holes 11*a* and 13*a* through which the rear end portions of the strings 30 pass are formed in the upper plate 11 and the bridge 13, respectively, and an auxiliary bridge 16 is provided on a peripheral surface of the main body 10.

Here, the type of string having the ball end 41 provided at a rear end portion is used as the strings 30.

Also, an auxiliary through-hole 15 is formed in the peripheral surface of the main body 10, that is, a rear side surface of the main body 10.

The auxiliary bridge 16 has a plurality of fixing holes 16*a* through which the strings 30 pass formed therein and is coupled to the auxiliary through-hole 15.

A method of installing the strings 30 in the string instrument configured as described above is as follows.

First, the front end portions of the strings 30 are coupled to the fixing holes 16*a* at the rear of the auxiliary bridge 16, and then the strings 30 are allowed to extend to the outside of the main body 10 through the communication holes 11*a* and 13*a*.

Then, when distal end portions of the strings 30 are coupled to the tuning pegs 21 and the tuning pegs 21 are tightened, as the strings 30 are pulled, the ball ends 41 are caught in the fixing holes 16*a* of the auxiliary bridge 16.

Then, after further tightening the tuning pegs 21 and tuning each string 30, the installation of the strings 30 may be completed.

In the string instrument configured as described above, since the rear end portions of the strings 30 extend to the inside of the main body 10, there is an advantage in that the structure is simplified compared to the above-described embodiments in which the auxiliary strings 40 should be separately installed.

DESCRIPTION OF REFERENCE NUMERALS

10: main body
20: neck
30: string
40: auxiliary string
50: support member
61: auxiliary tuning peg
62: auxiliary support member
70: muting mechanism
90: support frame

The invention claimed is:

1. A string instrument, comprising:
a main body having a space portion formed therein and a sound hole formed at one side thereof;
a neck provided to extend forward from the one side of the main body and have a tuning peg provided at a front end portion; and
a plurality of strings having both ends fixed to the tuning peg and the main body,
wherein a through-hole is formed at the one side of the main body, and
an auxiliary string inserted into the main body through the through-hole is provided inside the main body.

2. The string instrument of claim 1, further comprising:
a support member coupled to the through-hole; and
an auxiliary tuning peg provided at the other side of the main body,
wherein the auxiliary string has both ends fixed to the support member and the auxiliary tuning peg.

3. The string instrument of claim 2, wherein:
an auxiliary through-hole is formed at the other side of the main body;
the string instrument further comprises an auxiliary support member coupled to
the auxiliary through-hole; and
the auxiliary tuning peg is provided at the auxiliary support member.

4. The string instrument of claim 1, further comprising a support frame inserted into the main body through the through-hole and to which the auxiliary string is fixed,
wherein the support frame includes a first support plate detachably coupled to the through-hole, a second support plate provided to be spaced apart from the first support plate, a support bar configured to connect the first and second support plates, and an auxiliary tuning peg provided at the first support plate or the second support plate.

5. A string instrument, comprising:
a main body having a space portion formed therein;
a neck provided to extend forward from one side of the main body and have a tuning peg provided at a front end portion; and
a plurality of strings having both ends fixed to the tuning peg and the main body,
wherein rear end portions of the strings pass through the main body and extend to the inside of the main body, and
the string instrument further comprises a muting mechanism provided at the main body to selectively come in contact with the rear end portions of the strings extending to the inside of the main body and mute an auxiliary string,
wherein a bridge is provided on an upper plate of the main body;
communication holes through which the rear end portions of the strings pass are formed in the upper plate and the bridge, respectively;
an auxiliary through-hole is formed in a peripheral surface of the main body;

an auxiliary bridge is provided on the peripheral surface of the main body; and the rear end portions of the strings pass through the auxiliary through-hole and are fixed to the auxiliary bridge.

* * * * *